Patented Jan. 3, 1950

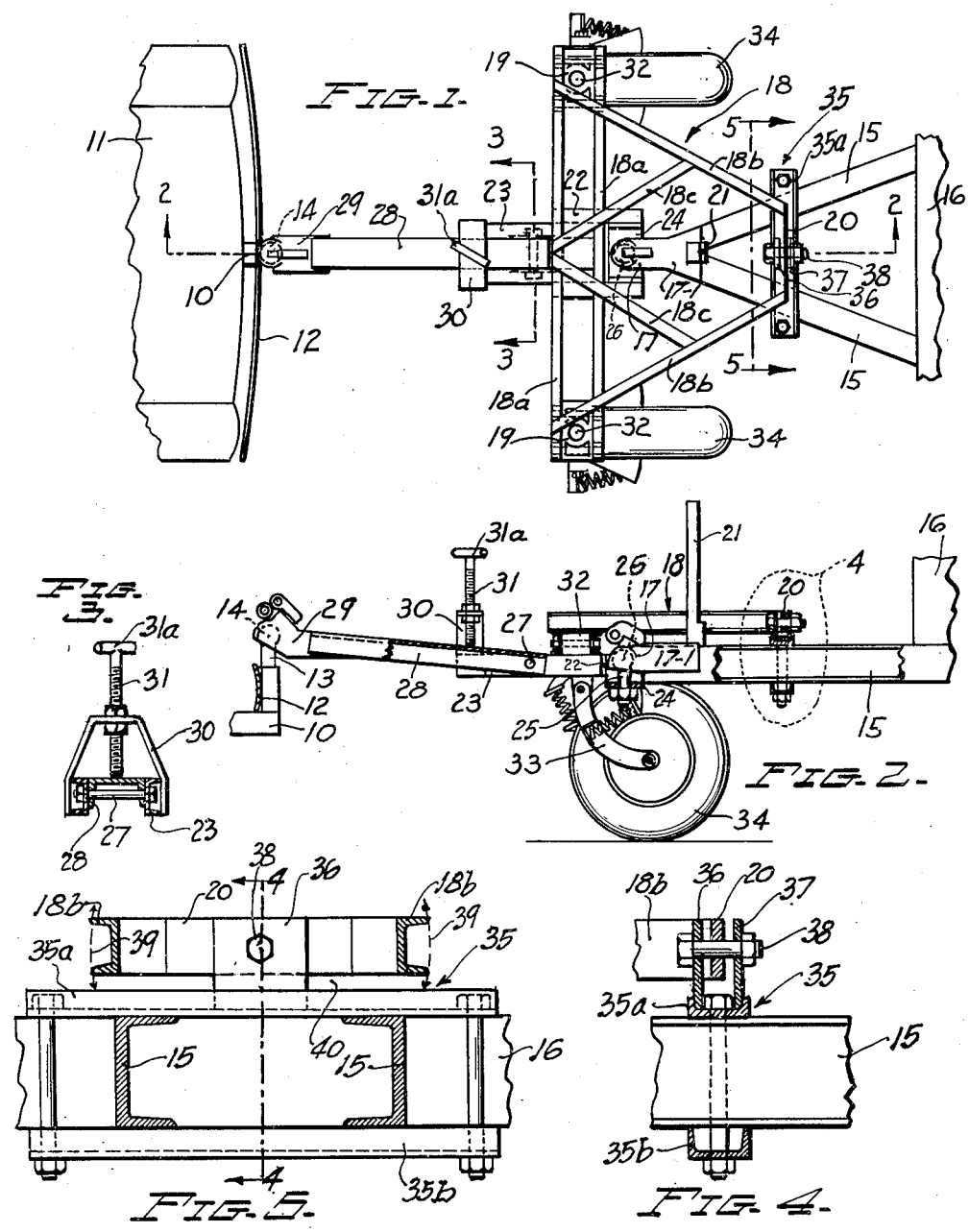

2,493,405

UNITED STATES PATENT OFFICE 2,493,405

DOLLY COUPLER FOR AUTOMOTIVE VEHICLES

Edward B. Hedgpeth, Salt Lake City, Utah

Application July 29, 1946, Serial No. 686,853

9 Claims. (Cl. 280—33.44)

This invention relates to couplers for securing trailers to automotive vehicles, and more particularly to couplers of the type known as "dolly" couplers wherein the coupling device is supported by its own wheel arrangement disposed between the automotive vehicle and the trailer.

The invention bears a certain relationship to that of my copending application Serial No. 665,774, filed April 29, 1946. In the present invention, however, a two-wheel arrangement is employed instead of a single wheel, whereby considerably greater load-bearing capacity is achieved. At the same time some of the advantageous features of my said prior invention are adaptable for use in combination with the present one. While it is preferred that dolly couplers constructed pursuant to the present disclosure embody the weight distributing feature of my prior invention, this is not necessarily so, since the present invention is susceptible of independent use.

Principal objects of the invention include those enumerated in my said copending application, as well as providing:

(a) A heavy-duty dolly coupler.

(b) A dolly coupler having two load-bearing wheels arranged to accommodate themselves transversely of the longitudinal dimension of the trailer tongue, to running conditions over rough roads, without unduly disturbing either the automotive vehicle or the trailer.

(c) Means for permitting transverse oscillation between coupler and trailer, and for largely preventing jerking stresses within certain portions of the coupler.

(d) A two-wheel arrangement in spaced side-by-side relation of the wheels, for advantageous use either with or without the weight-distributing properties of my prior invention.

An outstanding feature of the present invention resides in a pivoted frame structure that causes the road wheels to have a transversely oscillating relation with respect to the longitudinal line of the tongue of the trailer.

These and other objects and features of the invention will be fully explained in the following detailed description of the preferred specific embodiment illustrated in the accompanying drawing, wherein:

Fig. 1 represents a top plan view of the dolly coupler connecting a trailer to an automotive vehicle, the trailer and the vehicle being illustrated only fragmentarily;

Fig. 2, a side elevation, largely in longitudinal, vertical section taken on the line 2—2, Fig. 1;

Fig. 3, a vertical section taken on the line 3—3, Fig. 1, and enlarged somewhat;

Fig. 4, a vertical cross-section taken on the line 4—4, Fig. 5, or an enlargement of the fragmentary portion enclosed by the dotted loop 4, Fig. 2; and Fig. 5, a vertical section taken on the line 5—5, Fig. 1, greatly enlarged.

Referring to the drawing: at 10 is indicated a conventional support securely fixed to the rear of an automotive vehicle 11. Mounted on this support, and rising somewhat above the level of the bumper 12 of the vehicle, is a stem 13 carrying a ball 14, which forms part of a conventional, quickly manipulative ball and socket connection such as is in common use for coupling trailers directly to automotive vehicles. The forwardly extending tongue 15 of a trailer 16 carries the socket portion 17 of a second conventional, quickly manipulative ball and socket connection. The trailer tongue 15 in this instance consists of structural steel, the socket 17 having a rearwardly extending, inverted channel body 17—1 fitting over and welded to the tongue proper.

The dolly coupler of the invention is adapted to be disposed, as illustrated, between automotive vehicle 11 and trailer 16, the coupling functions being accomplished respectively at the two above-mentioned ball and socket connections.

The coupler embodies two road wheels of caster construction mounted in spaced side-by-side relationship in a supporting frame structure that is adapted to oscillate in a transverse, vertical plane that is substantially fixed in relation to the trailer. This arrangement provides maximum load-bearing capacity as well as accommodation to rough roads.

The frame structure of the dolly coupler, here designated 18, consists advantageously of structural steel members of suitable dimensions, welded together in a substantially V-type or isosceles triangular truss formation providing outrigger positions for mounting the road wheels. The frame structure includes a rearwardly extending central portion for making the aforesaid oscillation connection of dolly coupler to trailer tongue.

The trussed frame 18 embodies two laterally extending base members 18a, 18a, spaced apart at their ends by distance pieces 19, 19, and held together by bolts. Longitudinal side members 18b, 18b converge in substantially V-formation and are welded in place to a truncated apex formed by a head plate 20. Reinforcing members 18c, 18c, diverge from an apex upon the control portion of the base members, to which they are welded, to welded joinder with the respective side members 18b, 18b, at mutually similar points intermediate their lengths.

The frame structure thus formed has great strength, and provides outrigger positions (in the distance pieces 19, 19) for mounting the road wheels. Furthermore, clearance centrally thereof is provided for accommodating the usual trailer jack 21, which is mounted on the trailer tongue 15.

This frame structure 18 is secured preferably by welding, to the upper surface of a longitudinally extending dolly tongue arrangement, which carries parts of the two ball and socket coupling connections mentioned hereinbefore, and which preferably embodies the weight distributing feature of my prior invention.

The dolly tongue arrangement is here made up of a relatively wide section 22, to which is welded a narrower extension section 23, both sections being formed of spaced structural channels. A U-shaped bracket 24 depends from the rearward, free end of the wide section 22, and has secured therein an upstanding stem 25 carrying a ball 26, the latter being adapted to receive the socket part 17 in establishing the coupling between dolly coupler and trailer tongue 15.

Pivoted within the extension section 23, by means of a bolt 27, is a relatively long structural channel 28, which, at its forward, free end, carries a socket part 29 similar to the socket part 17. Such socket part 29 is adapted to receive the ball part 14 in establishing the coupling between the dolly trailer and automotive vehicle 11.

The channel 28, pivoted as it is, is capable of vertical oscillation, and accordingly, may be termed a "rocker arm." Straddling this rocker arm 28 may be provided a standard 30 of inverted U-shape, and threaded within the bend of the U is a vertically movable adjusting screw 31 having a T handle 31a. Such adjusting screw may be set in the manner fully explained in my aforementioned copending application, to distribute the weight of the trailer between dolly and automotive vehicle as desired.

The distance pieces 19, 19 have fixed therein stems 32, 32, Fig. 1, which depend to form respective bearing pins on which the swiveling forks 33, 33 of respective road wheels 34, 34 are mounted. Such swiveling forks and road wheels go to make up caster assemblies of the same conventional construction described in detail in my aforementioned copending application. These caster wheels permit convenient backing of automotive vehicle and trailer in the same way as does the single caster wheel of my prior invention.

The oscillation connection of frame structure 18 to trailer tongue 15 is accomplished through the head plate 20. To this end, a securing bracket 35 is secured to the tongue 15 intermediate its length, preferably by bolting, as shown. The bracket 35 advantageously comprises upper and lower clamp members 35a and 35b, respectively, formed of lengths of structural channel bolted back to back about the tongue 15. Rising substantially centrally from, and rigidly secured, preferably by welding, to the upper clamp member 35a, are spaced, longitudinally aligned standards 36 and 37. The head plate 20 is disposed between these standards 36 and 37, extending horizontally therebetween and mounted for oscillation in a vertical plane on a pivot pin 38, which is conveniently a bolt, as shown, passing through a suitable opening in the head plate. Sufficient clearance is provided between head plate 20 and the two standards 36 and 37 to insure free oscillation of the frame structure 18 about the pivot pin 38, and it is preferred also, that the bolt serving as the pivot pin 38 be not cinched tightly, so as to thereby allow limited freedom of movement thereof in the accommodation of the oscillatory movement of frame structure 18.

It should be noted that the oscillation connection, here the pivot pin 38, lies within a longitudinal vertical plane running centrally between the outrigger mountings of the road wheels 34, 34, and also, that the dolly tongue and coupling connections have their longitudinal axes lying within this plane.

The socket parts 17 and 29 of the two aforementioned ball and socket coupling connections are preferably as described in my copending application, and, as there, in themselves form no part of the invention, being rather, obtainable on the open market.

While it is very advantageous to utilize the weight distributing feature of my prior invention, namely, the standard 30 and adjusting screw 31 in connection with the rocker arm 28, the multi-wheel dolly of the present invention will function without it. Thus, the standard 30 and adjusting screw 31 could be eliminated without nullifying other advantageous features of the invention.

The frame 18 serves to keep the caster wheels under proper control, while the pivotal connection at 38 causes them to accommodate themselves to the varying road surfaces, thus providing virtually a three-point bearing effect of the trailer and dolly wheels upon any road surface. The arcuate arrows 39, Fig. 5, indicate the oscillating motion of the coupler in a plane transverse to the line of travel, it being observed that the space 40 should be sufficient to take care of the maximum required motion.

As desired, any lost motion that might develop between the ball 26 and its socket 17 is prevented from causing contact between the head plate 20 and either of the standards 36 or 37, as the case may be, by means of the spaced relation between them. The convenience of coupling or uncoupling by means of the present device is obvious.

Whereas this invention has been described with respect to a preferred specific embodiment thereof, it should be understood that various changes may be made in said embodiment and various other forms of the invention may be constructed by those skilled in the art without departing from the generic purview of the following claims.

I claim:

1. In a dolly coupler, a V-frame having spaced outrigger mountings and a truncated apex provided with a head plate; caster wheels operatively disposed in said mountings; an attachment bracket arranged for securement to the tongue of a trailer; mutually spaced standards extending from said bracket, said head plate being disposed between the standards; and pivot means connecting the head plate to the standards, whereby said caster wheels and mountings are free to oscillate transversely of the line of travel of said trailer.

2. A dolly coupler according to claim 1, wherein said frame is of substantially truss formation including reinforcing members extending from the sides of the frame to a point intermediate said outrigger mountings.

3. In a dolly coupler, a V-frame having a truncated apex provided with spaced outrigger mountings at the base of the V-frame; oscillation means comprising a head plate and bracket pivotally connected to each other and having the axis of oscillation thereof disposed within a vertical plane running centrally between said outrigger mountings; and caster road wheels operatively disposed in said outrigger mountings.

4. In a dolly coupler, a V-frame having a truncated apex and provided with spaced outrigger mountings for a pair of road wheels, at the base of the V-frame an oscillation connection comprising a head plate and a bracket pivotally connected together and having the axis of oscillation thereof disposed within a longitudinal vertical plane running centrally between said outrigger mountings; a dolly tongue connected to said frame structure and having its longitudinal axis disposed within said longitudinal vertical plane; and coupling means carried by said dolly tongue adjacent opposite ends thereof.

5. In a dolly coupler, a frame structure of substantially isosceles triangular truss formation having a truncated apex, and whose base extends laterally to provide spaced outrigger mountings; a pair of road wheels in said mountings; a head plate at said truncated apex; a bracket having spaced standards adapted to engage said head plate and being arranged for clamping to a trailer tongue, all arranged so that the frame body extends longitudinally and provides at its apex, an oscillation connection operatively disposed within a longitudinal vertical plane running centrally between said outrigger mountings; a dolly tongue connected to said frame structure and having its longitudinal axis disposed within the said longitudinal vertical plane; and coupling means carried by said dolly tongue adjacent opposite ends thereof.

6. In a dolly coupler, a frame structure of substantially isosceles triangular truss formation whose base extends laterally to provide spaced outrigger mountings for a pair of road wheels, and whose body extends longitudinally and provides a truncated apex; a head plate at said truncated apex; a clamping bracket having spaced standards adapted to detachably engage said head plate, said bracket being arranged for clamping to a trailer tongue so as to form an oscillation connection operatively disposed within a longitudinal vertical plane running centrally between said outrigger mountings; a dolly tongue connected to said frame structure and having its longitudinal axis disposed within the said longitudinal vertical plane, said dolly tongue terminating at one end intermediate the area of said frame structure; and coupling means carried by said dolly tongue adjacent opposite ends thereof.

7. In a dolly coupler, a frame structure of substantially isosceles triangular truss formation whose base extends laterally to provide spaced outrigger mountings for a pair of road wheels, and whose body extends longitudinally and provides, at its apex, an oscillation connection operatively disposed within a longitudinal vertical plane running centrally between said outrigger mountings; a dolly tongue connected to said frame structure and having its longitudinal axis disposed within the said longitudinal vertical plane, said dolly tongue terminating at one end intermediate the area of said frame structure and having its other end constructed in the form of a rocker arm, articulative in a vertical plane; and coupling means carried by said dolly tongue adjacent opposite ends thereof.

8. In a dolly coupler, a frame structure of substantially isosceles triangular truss formation whose base extends laterally to provide spaced outrigger mountings for a pair of road wheels, and whose body extends longitudinally and provides, at its apex, an oscillation connection operatively disposed within a longitudinal vertical plane running centrally between said outrigger mountings; a dolly tongue connected to said frame structure and having its longitudinal axis disposed within the said longitudinal vertical plane, said dolly tongue terminating at one end intermediate the area of said frame structure, and having its other end constructed in the form of a rocker arm, articulative in a vertical plane; means for adjusting said rocker arm portion of the dolly tongue in a vertical plane and for maintaining the same in its adjusted position; and coupling means carried by said dolly tongue adjacent opposite ends thereof.

9. In a dolly coupler, a frame structure of substantially isosceles triangular truss formation whose base extends laterally to provide spaced outrigger mountings for a pair of road wheels; and whose body extends longitudinally and provides, at its apex, an oscillation connection operatively disposed within a longitudinal vertical plane runnings centrally between said outrigger mountings; said oscillation connection comprising a head plate providing the apex portion of said frame structure, a clamping bracket structure, and a pivot pin loosely attaching said head plate to said bracket structure, said pivot pin lying within the said longitudinal vertical plane and defining the axis of oscillation; a dolly tongue connected to said frame structure and having its longitudinal axis disposed within the said longitudinal vertical plane, said dolly tongue terminating at one end intermediate the area of said frame structure; and coupling means carried by said dolly tongue adjacent opposite ends thereof.

EDWARD B. HEDGPETH.

REFERENCES CITED

The following references are of record in the file of this patent:

UNITED STATES PATENTS

| Number | Name | Date |
| --- | --- | --- |
| 2,325,822 | Whitmer | Aug. 3, 1943 |
| 2,344,921 | McDaniel | Mar. 21, 1944 |
| 2,379,170 | McDaniel | June 26, 1945 |